April 22, 1930.　　　E. F. COWLEY　　　1,755,685

SHOCK ABSORBER MEANS FOR VEHICLES

Filed May 9, 1925

INVENTOR
Edwin F. Cowley
By C. T. Heinkel.
ATTORNEY

Patented Apr. 22, 1930

1,755,685

UNITED STATES PATENT OFFICE

EDWIN F. COWLEY, OF CLEVELAND, OHIO, ASSIGNOR OF ONE-HALF TO WILLIAM E. BRANDT, OF CLEVELAND, OHIO

SHOCK-ABSORBER MEANS FOR VEHICLES

Application filed May 9, 1925. Serial No. 29,085.

My invention relates to shock absorber structures generally and more particularly to double acting springs and means for suspending such springs as related to vehicle axles.

The object of my invention is to provide a simple, inexpensive and efficient shock absorber means.

In many instances, it is quite desirable and even necessary that one member of a structure is held in resilient relation to another member thereof and that such resilient relation must be confined within certain limits.

In shock absorbing means of vehicles for instance, it is quite desirable that the body of the vehicle does not move up and down too much when the wheel of the vehicle strikes a rut or an elevation.

The present invention aims to not only cushion the vehicle body in both up and down directions when the wheels of the vehicle strike a rut or an elevation but also cushion the rebound of the body when such rebound is caused by either up or down movement of the body.

This explanation of the principle of my invention, as applied to a vehicle, is, of course, general only. I am aware that the same principle can be applied to other structures wherein a spring acts in a certain direction to accomplish a certain result but where the rebound of the spring is or should be confined within certain limits.

My invention is sufficiently illustrated in the accompanying drawing which shows a shock absorbing means for a vehicle, embodying the features of my invention, and in which:—

Similar reference characters refer to similar parts throughout the views.

Figure 1:
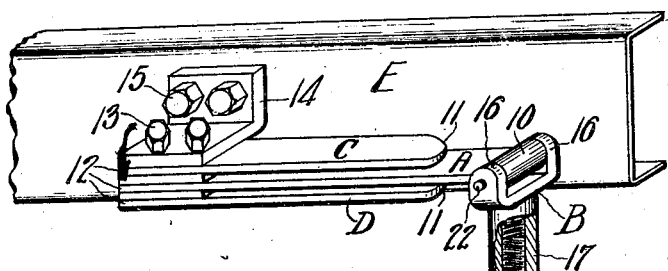
Fig. 1 is a perspective view of one type of a spring and a suspension means shown applied to the frame and the axle of a vehicle and shows a spring composed of one main leaf and one ancillary leaf superimposed on each side of the main leaf and spaced therefrom and one end of all of the leaves connected to the frame and the other end of the main leaf connected to the axle.

Referring now particularly to Fig. 1 which shows a spring of the cantilever type.

In this instance, the main leaf A is made of flat material, the body portion is straight and has the eye 10 formed on one end thereof.

One ancillary leaf C is superimposed on one side of the main leaf A and one ancillary leaf D is superimposed on the other side of the main leaf A, both ancillary leaves are here spaced from the main leaf.

The ends 11 of both ancillary leaves are free. The ends 12 of all leaves are secured together by the bolts 13 passing through all of the leaves and through the bracket 14 which is secured to the frame E by means of the bolts 15. This structure firmly secures all ends 12 to the frame and to each other.

The suspension means comprises the yoke B, the stud F, and the bracket G.

The yoke B has the ears 16 straddling the eye 10 of the leaf A and also has the body portion 17 threaded internally from one end thereof.

The stud F has the externally threaded end 18 screwed into the internally threaded end of the body 17, and also has the hexagonal portion 19 to accommodate a wrench to rotate the stud F for the purpose of lengthening or shortening the suspension means to adjust the spring, and also has the ball end 20. The nut 21 is screwed tight against the end of the body 17 to lock the stud against rotation in the yoke after the spring is adjusted. The eye 10 is hinged to the ears 16 by means of the pin 22.

The bracket G has the recess 23 formed in the bottom thereof to fit over the axle H and the cap 24 is secured to the lower end of the bracket by the bolts 25 to firmly clamp the bracket to the axle in desired position.

The bracket G also has a ball socket formed in the upper end thereof; the center of the ball socket being directly vertically of the axis of the axle H. The ball end 20 fits into this socket and is held therein by the cap 26 which is secured to the upper end of the bracket by the bolts 27.

The object of the ball joint is to provide a universal joint for the suspension means so that the relative horizontal movements between the frame and the axle, in any direction, does not put a stress on the suspension means or on the spring.

When the mechanism is assembled as shown, the stud F is rotated until the tension of the spring A is adjusted so that the shocks as well as the rebounds are cushioned to a desired degree after which the nut 21 is tightened against the end of the body 17 to lock the adjustment.

In operation:—when the axle H moves upward suddenly, the main leaf resists the first upward movement and is augmented by the ancillary leaf C after the main leaf engages the free end of the leaf C and thereby cushions the relative vertical movement between the axle and the frame. When the spring stops this vertical movement, a certain amount of tension is stored in the spring which starts a rebound.

During this rebound, the leaves A and C reach their normal positions and, due to the momentum created by this rebound, the end 10 of the leaf A tends to move downward below its normal position in the nature of a spring and is further cushioned and resisted in this downward movement when it contacts the free end 11 of the ancillary leaf D which tends to retain the leaf A in normal position and thereby tends to avoid as much as possible of the vertical relative movement between the frame and the axle. In this spring, the main leaf A acts alone in the spaces between the ancillary leaves and the main leaf to take up the lighter shocks and is augmented by the ancillary leaves to take up the heavier shocks.

When the axle suddenly moves downward, the reverse of the above operation takes place and the leaf D augments the downward resistance of the leaf A while the leaf C augments the rebound.

Figure 2:
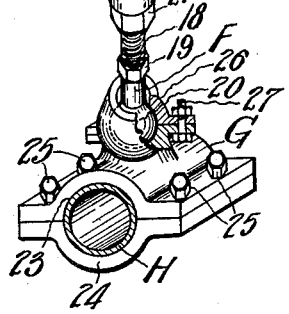
Fig. 2 is a perspective view of one end of a spring showing two main leaves and a preferred manner of arranging the eyes on these ends and one ancillary leaf superimposed on each side of the main leaf and contacting the main leaf.
Figure 2:
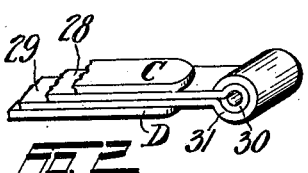

I may use more than one main leaf. In Fig. 2 I show the end of a spring having two main leaves 28 and 29. In such structure I prefer to form the eye 30 on the leaf 28 and the eye 31 on the leaf 29 and over the eye 30 with the eyes bent in opposite directions as shown.

Figure 3:
Fig. 3 is a perspective view of a spring showing one curved main leaf and two ancillary leaves superimposed on each side of the main leaf and all of the leaves contacting the adjacent leaves.

In many instances it is desirable that the spring should be stiffer in one direction than in the other. In such cases I either curve the leaves in one direction as shown in Fig. 3 or I superimpose more auxiliary or ancillary leaves on one side than on the other.

Instead of using more than one main leaf and one ancillary leaf on each side thereof, I may use one main leaf and a plurality of ancillary leaves on each side of the main leaf. Various combinations of leaves may be devised to accommodate various purposes; the only precaution to be taken is that the eye of the main leaf is spaced a considerable distance from the end of the ancillary leaves so that the main leaf must of itself flex considerably before the same begins to flex the ancillary leaves.

Figure 4:
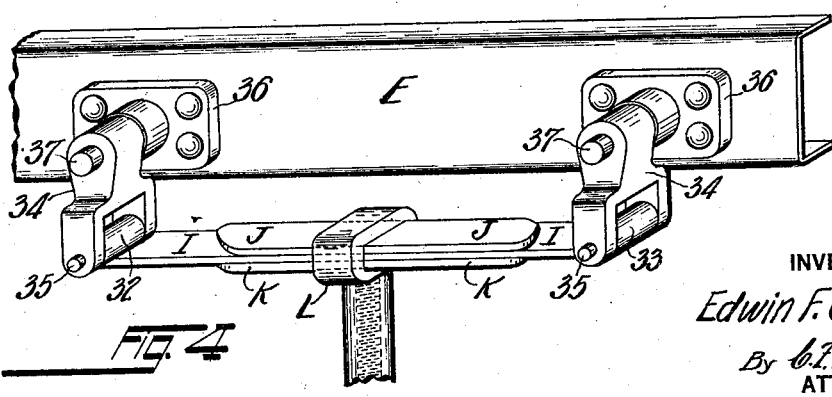
Fig. 4 is a perspective view of a spring and suspension means and shows a spring composed of one straight main leaf and one ancillary leaf superimposed on each side of the main leaf and contacting the same and both outer ends of the main leaf connected to the frame and the axle connecting means attached to the middle portion of all of the leaves.

Referring now to Fig. 4 which shows a spring of the double cantilever type.

In this instance, the main leaf I is flat and straight and has the eyes 32 and 33 bent on the ends thereof. The ancillary leaves J and K are superimposed on the sides of the main leaf similar to Fig. 1.

The shackles 34 have the lower ends thereof hinged to the eyes 32 and 33 respectively, by means of the pins 35 and the upper ends thereof hinged to the brackets 36 by means of the pins 37. The brackets 36 are riveted to the frame E.

The upper end of the yoke L clamps all of the leaves together substantially midway of the ends although such clamping may be effected nearer one end than the other in case an unequal spring action is desired. The lower end of the yoke L is threaded internally similar to the lower end of the body 10 of Fig. 1 and the suspension members shown in Fig. 1 may be screwed into this internally threaded end although other means may be substituted for connecting the spring to the axle.

The device shown in Fig. 4 operates similar to the device shown in Fig. 1. In either case one portion of the main leaf is connected to the frame and another portion to the axle and the ancillary leaves augment the resistance of the main leaf in both directions.

I am aware that leaf springs of the cantilever type have been made; therefore, I do not claim such feature broadly but I do claim:—

1. A spring having a main leaf flexible individually within a certain limit in two sidewise directions, an ancillary leaf at each side of said main leaf and arranged so that each of said ancillary leaves is brought under tension individually when said main leaf is flexed beyond said certain limit at the corresponding ones of said sides, one portion of all of said leaves rigidly connected together to permanently hold the same in the relation set forth, and means on the free portion of said main leaf for suspension on an associated structure, and comprising a normally unrotatable yoke swivable on said free portion of the main leaf and a stud threaded to said yoke and having a ball seat on the associated structure.

2. In combination, a vehicle having a frame member and an axle member movable in relation to each other, a spring having a main leaf flexible individually within a certain limit in two sidewise directions and an ancillary leaf at each side of said main leaf, each of said ancillary leaves normally free of tension against said main leaf and arranged to come into action individually when said main leaf is flexed beyond said certain limit, one portion of all of said leaves rigidly connected together to permanently hold the same in the relation set forth, said rigidly connected portions permanently fixed to one of said members, and a connector between a flexible portion of said main leaf and the other one of said members and comprising a normally unrotatable yoke swivable on said free portion of the main leaf and a stud threaded to said yoke and having a ball seat on said other member.

3. In combination, a vehicle having a frame member and an axle member movable in relation to each other, a spring have a main leaf individually flexible within a certain limit in two sidewise directions and an ancillary leaf at each side of said main leaf, each of said ancillary leaves normally free of tension against said main leaf and arranged to come into action individually when said main leaf is flexed beyond said limit, one portion of all of said leaves rigidly connected together to permanently hold the same in the relation set forth, said rigidly connected portions permanently fixed to one of said members, a longitudinally adjustable connection between a flexible portion of said main leaf and the other one of said members and comprising two members threaded together longitudinally, and the longitudinal axis of said connection substantially intersecting the axis of said other member.

4. A spring means between two relatively movable members having a main leaf supported on one of said members and of sufficient strength to individually carry a certain load within a certain bending distance thereof, ancillary leaves normally free of said main leaf within said distance and arranged to come into action individually when said main leaf is bent beyond said distance and thereby augment said main leaf when more than said certain load is imposed thereon, and a connector between the free end of said main leaf and the other one of said members and comprising a stud having a ball on one end thereof and a seat therefor in said other member and a yoke swivable on said free end of the main leaf and threaded to the other end of said stud.

5. In a shock absorber, a pair of members movable in relation to each other, a spring having a main leaf and ancillary leaves, one portion of each of said leaves connected at a common point fixed on one of said members, a connector between a flexible portion of said main leaf and the other one of said members and comprising a stud having a ball on one end thereof and a seat therefor in said other member and a yoke swivable on said flexible portion of the main leaf and threaded to the other end of said stud, said main leaf arranged to cushion the movement between said members within certain limits, said ancillary leaves arranged to additionally cushion the movement between said members beyond said certain limits, and each of said ancillary leaves acting individually and independently of others of said ancillary leaves.

6. In a shock absorber for a vehicle having a frame member and an axle member movable in relation to each other, a leaf spring between said members, one portion of all of the leaves of said spring rigidly connected together and fixed on one of said members, one leaf of said spring having an eye on the free portion thereof, the free portions of other leaves of said spring being normally inactive and free to be brought into action independently of others of said leaves, and a connection between said eye and the other one of said members comprising a member having a ball on one end thereof seated in a ball seat in said other member and a yoke swivable on said eye and threaded to the other end of the member having the ball.

7. In a shock absorber for a vehicle having a frame member and an axle member movable in relation to each other, a leaf spring between said members, one portion of all of the leaves of said spring rigidly connected together and fixed on one of said members, one leaf of said spring having an eye on the free portion thereof, the free portions of other leaves of said spring being normally inactive and free to be brought into action independently of others of said leaves, a connection having a ball seat on said other member, and a connector having a ball swivable on said seat and a yoke threaded to the same and swivable on said eye.

8. A shock absorber means including a bracket means attachable to an axle of a vehicle and having a ball socket in the upper part thereof directly vertical of the axis of the axle of the vehicle, a connector means seated in said ball socket and having a pair of ears, and a spring having a main leaf pivotally connected to said ears and ancillary leaves spaced from said main leaf; one end of all of said spring leaves being connected together and secured to the frame of the vehicle.

9. A shock absorber means including a bracket means attachable to an axle of a vehicle and having a ball socket in the upper part thereof directly vertical of the axis of the axle of the vehicle, a connector means including an externally threaded stud having a ball seated in said ball socket and a yoke adjustably threaded onto said stud and having a pair of ears, a nut threaded onto said stud to lock said yoke to said stud, and a spring having a main leaf pivotally connected to said ears and ancillary leaves spaced from said main leaf; one end of all of said spring leaves being connected together and secured to the frame of the vehicle.

EDWIN F. COWLEY.